US008033702B2

(12) United States Patent
Ansari et al.

(10) Patent No.: US 8,033,702 B2
(45) Date of Patent: Oct. 11, 2011

(54) SYSTEM AND METHOD FOR HEAT DISSIPATION FROM AN AUTOMOTIVE LIGHTING ASSEMBLY HAVING A LIQUID COOLING CIRCUIT

(75) Inventors: Ajmal Imran Ansari, Canton, MI (US); Edwin Mitchell Sayers, III, Stuttgart (DE)

(73) Assignee: Visteon Global Technologies, Inc., Van Buren Township, MI (US)

(*) Notice: Subject to any disclaimer, the term of this patent is extended or adjusted under 35 U.S.C. 154(b) by 0 days.

(21) Appl. No.: 13/022,887

(22) Filed: Feb. 8, 2011

(65) Prior Publication Data

US 2011/0128753 A1 Jun. 2, 2011

Related U.S. Application Data

(63) Continuation of application No. 12/194,663, filed on Aug. 20, 2008, now Pat. No. 7,883,251.

(51) Int. Cl.
*B60Q 1/00* (2006.01)

(52) U.S. Cl. .................. 362/547; 362/294; 362/296.01; 362/373; 362/544; 362/546

(58) Field of Classification Search .................. 362/294, 362/296.01, 373, 544, 546–547
See application file for complete search history.

(56) References Cited

U.S. PATENT DOCUMENTS

| | | | | |
|---|---|---|---|---|
| 6,910,794 | B2 * | 6/2005 | Rice | 362/547 |
| 7,204,615 | B2 | 4/2007 | Arik et al. | |
| 7,210,832 | B2 | 5/2007 | Huang et al. | |
| 7,249,868 | B2 | 7/2007 | Chinniah et al. | |
| 7,292,438 | B2 | 11/2007 | Chen et al. | |
| 7,883,251 | B2 * | 2/2011 | Ansari et al. | 362/547 |
| 2006/0181894 | A1 | 8/2006 | Chinniah et al. | |
| 2007/0127252 | A1 | 6/2007 | Fallahi et al. | |

* cited by examiner

*Primary Examiner* — Stephen F Husar
*Assistant Examiner* — Meghan Dunwiddie
(74) *Attorney, Agent, or Firm* — Brinks Hofer Gilson & Lione

(57) ABSTRACT

An automotive headlamp assembly having a closed-loop cooling circuit. The headlamp assembly includes a housing cooperating with a transparent lens cover to define a chamber. At least one light source is located within the chamber. The cooling circuit has at least one cold plate thermally coupled to the light source. A radiator is fluidly coupled to the cold plate by a plurality of tubes. The tubes are oriented at least partially upwardly and configured to circulate a fluid through the cooling circuit as a result of heating and cooling of the fluid therein.

21 Claims, 1 Drawing Sheet

SYSTEM AND METHOD FOR HEAT DISSIPATION FROM AN AUTOMOTIVE LIGHTING ASSEMBLY HAVING A LIQUID COOLING CIRCUIT

CROSS REFERENCE TO RELATED APPLICATION

This application is a continuation of U.S. application Ser. No. 12/194,663, filed Aug. 20, 2008, now U.S. Pat. No. 7,883,251, the entire contents of which are herein incorporated by reference.

BACKGROUND

1. Field of the Invention

The present invention generally relates to an automotive exterior lamp assembly. More particularly, the invention relates to heat dissipation from an automotive headlamp assembly.

2. Description of the Known Technology

In recent years, light emitting diodes (LEDs), individually and in arrays, have become a popular light source for automotive lighting applications. LEDs are typically used in automobiles to provide lighting for the interior cluster of a Center High Mount Stop Lamp (CHMSL) and the rear lamps of an automobile. Used in such applications, LEDs have several advantages over traditional incandescent light bulbs. For example, LEDs have increased efficiency, faster response times, low electrical current requirements, longer operating life, and can be surface mounted and manufactured using techniques well developed in electronic manufacturing unlike traditional incandescent bulbs which typically require through-hole mounts.

Even with the above advantages, one drawback with the use of LEDs as a light source is that, during operation, the LEDs and associated electrical components generate a significant amount of heat for their physical size. If the heat generated by the LED is not efficiently dissipated, internal temperature of the LED will exceed the safe limits and the LED will degrade and possibly fail. In addition, excessive LED temperatures generally cause LED efficiency to decline and change the color of the light produced.

Since the performance of an LED depends, in part, on maintaining the temperature of the LED below a maximum operating temperature, it is advantageous to provide the headlamp assembly with a means for cooling the LED, its associated electronics, and potentially the chamber within which it is located.

Thus, there exists a need for a solution that provides LEDs with enhanced heat dissipation capabilities.

SUMMARY

In overcoming the drawbacks and the limitations of the known technologies, an automotive headlamp assembly with enhanced heat dissipation capabilities is disclosed.

In one embodiment, the headlamp assembly comprises a housing having a housing wall defining an opening. A transparent lens cover is coupled to the housing wall and covers the opening forming a chamber. At least one light source is disposed within the chamber and a reflector is positioned within the chamber and adapted to reflect light from the light source. A partially vertically arranged cooling circuit is also at least partially disposed within the chamber. The cooling circuit comprises at least one cold plate thermally coupled to the light source. At least one radiator is partially vertically connected to the cold plate. Tubes are configured to circulate a fluid through the cooling circuit in a partially vertical direction to effectively cool the light source.

In another embodiment, the headlamp assembly comprises a housing defining an opening. A transparent lens cover is coupled to the housing wall and covers the opening forming a chamber. A plurality of light sources is disposed within the chamber and a reflector is positioned within the chamber to reflect light from at least one of the light sources. A partially vertically arranged cooling circuit is also at least partially disposed within the chamber. The cooling circuit comprises a plurality of cold plates, each of which is thermally coupled to at least one of the light sources. At least one radiator is partially vertically connected to the cold plates. Tubes are configured to circulate a fluid through the cooling circuit in a partially vertical direction to effectively cool the light sources.

In another embodiment, the headlamp assembly comprises a housing defining an opening. A transparent lens cover is coupled to the housing wall and covers the opening forming a chamber. Disposed within the chamber is a plurality of light sources and a reflector is positioned within the chamber to reflect light from at least one of the light sources. A cooling circuit is at least partially disposed within the chamber and partially vertically arranged. The cooling circuit includes a plurality of cold plates, each of which is thermally coupled to at least one of the light sources. Each of the cold plates includes a cold plate channel having a cold plate inlet and a cold plate outlet. The cooling circuit further includes at least one radiator connected to the plurality of cold plates. The radiator is generally vertically oriented and includes a radiator channel having a radiator inlet and a radiator outlet. A plurality of at least partially vertically oriented tubes circulates a fluid through the cooling circuit to effectively cool at least one of the light sources. The plurality of tubes includes a series of tubes that connect the cold plates in series. The plurality of tubes further includes a tube connecting the outlet of the last cold plate with the inlet of the radiator. A further tube connects the outlet of the radiator to the inlet of the first in the series of cold plates. Other arrangements for the cooling circuit include a parallel arrangement, wherein the cold plates are arranged in parallel, or a combination of a series arrangement and a parallel arrangement.

Further, a method of dissipating heat inside an automotive headlamp assembly is disclosed. The headlamp assembly includes a housing, a chamber formed within the housing, a plurality of light sources within the chamber, and an at least partially vertically arranged cooling circuit. The cooling circuit includes one or more cold plates thermally coupled to the light sources, at least one radiator, and a plurality of tubes configured to circulate a fluid through the cooling circuit. In one embodiment, the method comprises providing a flow of fluid through the cooling circuit. Heat is collected from at least one light source by providing the flow of fluid through a cold plate, wherein the heat is conducted to the fluid. The heated flow of fluid is provided to a radiator, wherein the heat is conducted to the outside environment and the fluid is cooled. The fluid continuously flows through the closed circuit while at least one of the light sources is in operation. As the heated fluid rises within the cold plates, the fluid travels in a partially vertical direction through the tubes to the radiator. As the cooled fluid falls within the radiator, the fluid travels in a partially vertical direction through the tubes back to the cold plates.

Further objects, features and advantages of this invention will become readily apparent to persons skilled in the art after a review of the following description, with reference to the drawings and claims that are appended to and form a part of this specification.

DETAILED DESCRIPTION

Figure 1:
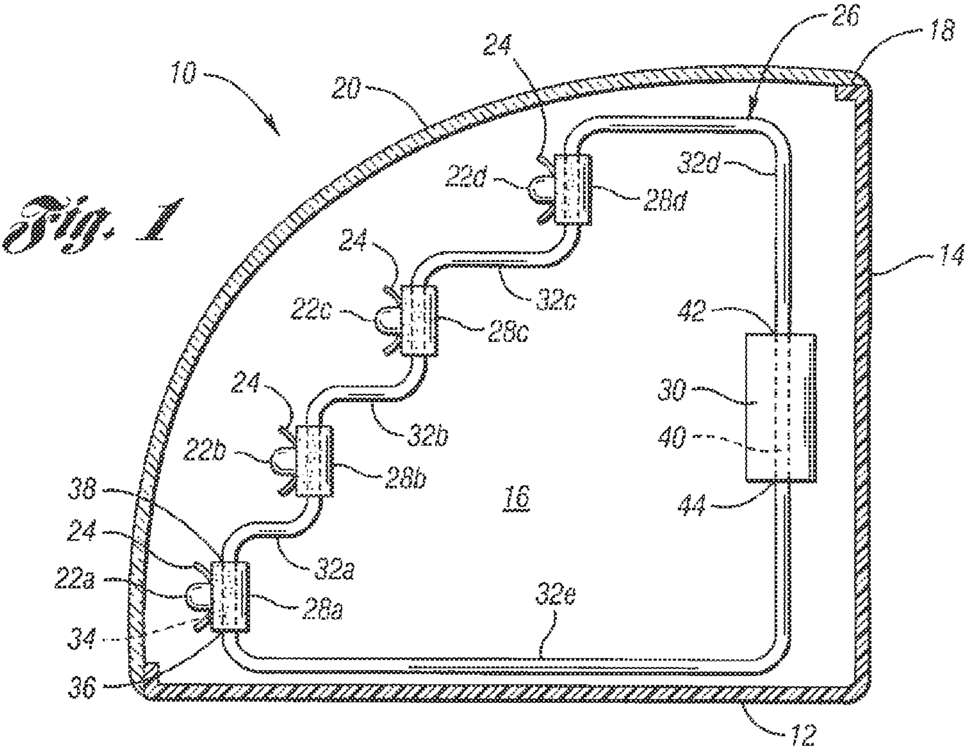
FIG. 1 is a diagrammatic side view of an embodiment of a light assembly incorporating the principles of the present invention.
Figure 2:
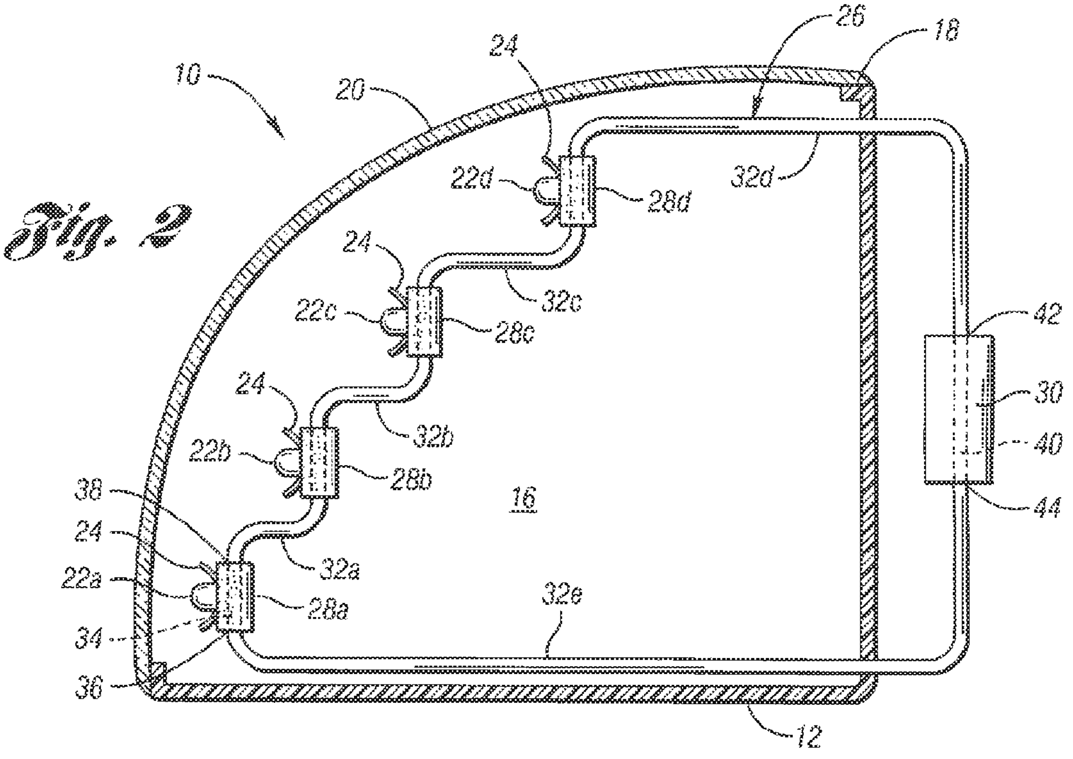
FIG. 2 is a diagrammatic side view of another embodiment of the present invention.

Referring now to the drawings, FIGS. 1 and 2 illustrate a headlamp assembly 10 having a housing 12 including a housing wall 14 defining a chamber 16 and an opening 18. Generally, the housing wall 14 is composed of a rigid and/or thermally-insulating material, such as plastic. However, the housing wall 14 may be made of any material suitable for this purpose, such as metal materials. A transparent lens cover 20 is coupled to the housing 12 so as to extend over the opening 18 and enclose the chamber 16. The transparent lens cover 20 is preferably made of a transparent plastic, but may be made of any transparent material, such as glass.

The headlamp assembly 10 includes a light source 22, such as a light emitting diode array (hereinafter "LEDs 22"), and a reflector 24 adapted to reflect light from the LEDs 22. As shown in FIGS. 1 and 2, the headlamp assembly 10 may include a plurality of individual LEDs 22*a*, 22*b*, 22*c*, 22*d*. During operation of the headlamp assembly 10, the LEDs 22 generate heat and increase the temperature of the air located within the chamber 16 and the components defining the chamber 16. However, the LEDs 22 and/or the electronic components connected to the LEDs 22 may experience diminished performance or failure if their maximum operating temperature is exceeded. To avoid this, the headlamp assembly 10 includes a liquid cooling circuit 26 disposed wholly (FIG. 1) or partially (FIG. 2) within the chamber 16.

The liquid cooling circuit 26 is a closed circuit and includes at least one cold plate 28 connected to at least one radiator 30 through partially vertically oriented tubes 32. The tubes 32 are partially vertically oriented to circulate a coolant through the circuit in a vertical or partially vertical direction. Acceptable coolants include water, ethylene glycol, a mixture of water and ethylene glycol, or other proprietary heat transfer fluids used in the industry for such purpose. As shown in FIGS. 1 and 2, the liquid cooling circuit 26 may include a series of cold plates 28*a*, 28*b*, 28*c*, 28*d* connected to the radiator 30 through a series of tubes 32*a*, 32*b*, 32*c*, 32*d*, 32*e*. In FIG. 2, the radiator 30 is positioned outside of the housing 12 and tubes 32*d* and 32*e* extend from within the chamber 16 through a rear portion of the housing wall 14. As will be appreciated, it is also within the scope of the present invention for the radiator 30 to be positioned partially inside and partially outside the housing 12.

The cooling circuit 26 may be supported within the housing 12 in a number of ways. Each of the cold plates 28 and the radiator 30 may be individually mounted in the housing 12 by any support means, such as a support post, bracket or other structure. However, this can become very complex if there are many cold plates 28 within the cooling circuit 26. Another option is to support the plurality of cold plates 28 via a bezel or an adjustable frame and mount the bezel within the housing 12 by any common support mechanisms. The tubes 32*a-c* then connect each of the cold plates 28 and the tubes 32*d-e* connect the cold plates 28 to the radiator 30 to complete the cooling circuit 26. In this instance, the tubes 32 may be supported by the cold plates 28 and radiator 30.

At least one LED 22 is thermally coupled to each of the cold plates 28. In achieving this, LEDs 22 may be directly mounted to the cold plates 28, or they may be indirectly mounted to the cold plates 28 via a substrate. For example, a retainer clip may attach an LED substrate to a face of the cold plate 28 and the LED 22 may be attached to the LED substrate by a solder joint or a thermally conductive adhesive. The faces of the cold plates 28 that come in contact with the LED or LED substrate are made of highly conductive material, such as copper, aluminum, or any other suitable conductive material in the art. The other faces of the cold plate may or may not be made of highly conductive material.

Each of the cold plates 28*a-d* includes a cold plate channel 34 defined and passing therethrough and having an inlet 36 and an outlet 38 (see cold plate 28*a*), wherein the outlet 38 is located above the inlet 36. The radiator 30 includes a radiator channel 40, also having an inlet 42 and an outlet 44, wherein the outlet 44 is located below the inlet 42. The cold plate channel 34 and the radiator channel 40 may include more than one channel joined together by air convection fins within the cold plate and the radiator, respectively.

As fluid circulates within the cooling circuit 26, the fluid inside the cold plate channels 34 warms as heat generated by the LEDs 22 is conducted through the cold plates 28 to the fluid within the channel 34. Being heated, the fluid is less dense and tends to rise in the circuit 26. Upon reaching the radiator 30, the fluid enters the radiator channel 40 and cools as heat from the heated fluid is conducted through the radiator 30 to the surrounding environment. Preferably, the radiator 30 is disposed at or outside of the housing wall 14 and conducts heat from the fluid, and the air within the chamber 16, to the outside environment, which is at a lower temperature.

As the fluid within the cold plate channels 34 is heated, it rises in the circuit 26 due to a reduction in its density. Conversely, as the fluid within the radiator channel 40 cools, it falls in the circuit 26 due to an increase in its density. The rising fluid is propelled through the cold plates 28, traveling in a partially vertical direction through tubes 32. For example, the fluid rises within each of the cold plate channels 34, traveling from each of the cold plate inlets 36 to each of the cold plate outlets 38. As the fluid inside each cold plate channel 34 rises, it displaces the fluid above into the next sequential tube, i.e., the fluid within the cold plate 28*a* is displaced into the tube 32*a*, which displaces fluid into the cold plate 28*b*, which displaces fluid into the tube 32*b*, which displaces fluid into the cold plate 28*c*, which displaces fluid into the tube 32*c* and so on until reaching the radiator 30. Inside the radiator 30 the fluid cools and falls from the radiator inlet 42 to the radiator outlet 44. In doing so, it displaces the fluid below into the tube below, i.e., the fluid within the radiator 30 is displaced into the tube 32*e*. Thereafter, the fluid travels in a partially vertical direction through the tube 32*e* back to the first of the cold plates 28, cold plate 28*a*.

The fluid traveling within the cooling circuit 26 is coolest when traveling from the radiator 30 to the first cold plate 28*a* and warmest when traveling from the last cold plate 28*d* to the radiator 30 through the tube 32*d*. Thus, the cold plate 28*a* is cooled first and the cold plate 28*d* is cooled last.

The continuous heating and cooling, and resultant gravity assisted rising and falling of the fluid in the partially vertical circuit 26, are what drives the fluid through the cooling circuit 26, creating a self-stabilizing, closed-loop cooling system. The movement of the fluid is proportional to the heat generated by the LEDs 22 and transferred through to the fluid. If desired, the cooling circuit 26 may include a pump to increase the flow rate of the fluid circulating within the circuit 26.

As a person skilled in the art will readily appreciate, the above description is meant as an illustration of implementation of the principles of this invention. This description is not intended to limit the scope or application of this invention in that the invention is susceptible to modification, variation and change, without departing from spirit of this invention, as defined in the following claims.

The invention claimed is:

1. An automotive lamp assembly for a motor vehicle comprising:

at least one light source located within the lamp assembly; and a closed-loop cooling circuit comprising:

at least one cold plate, the cold plate being thermally coupled to the light source;

at least one radiator; and a plurality of tubes connecting the cold plate to the radiator, the tubes at least partially vertically oriented relative to the vehicle and configured to circulate a fluid from the cold plate to the radiator and through the cooling circuit as a result of heating of the fluid by the cold plate and cooling of the fluid by the radiator.

2. The lamp assembly of claim 1 wherein the cold plate defines a cold plate channel having a cold plate inlet and a cold plate outlet, the cold plate outlet being located above the cold plate inlet relative to the motor vehicle.

3. The lamp assembly of claim 1 wherein the radiator defines a radiator channel having a radiator inlet and a radiator outlet, the radiator inlet being located above the radiator outlet relative to the motor vehicle.

4. The lamp assembly of claim 1 wherein the at least one cold plate includes a plurality of cold plates, wherein the plurality of cold plates is connected in series by the plurality of tubes.

5. The lamp assembly of claim 1 wherein the at least one cold plate includes a plurality of cold plates, wherein the plurality of cold plates is connected in series with the radiator by the plurality of tubes.

6. The lamp assembly of claim 1 wherein the at least one light source includes a plurality of light sources, wherein the plurality of light sources includes at least one light emitting diode.

7. The lamp assembly of claim 1 wherein the radiator is enclosed within the lamp assembly.

8. The lamp assembly of claim 1 wherein the radiator is disposed outside of the lamp assembly.

9. The lamp assembly of claim 1 wherein at least one of the tubes is more thermally conductive than at least one other of the tubes.

10. The lamp assembly of claim 1 wherein at least one of the tubes is more thermally insulative than at least one other of the tubes.

11. The lamp assembly of claim 1 wherein the cooling circuit includes a pump to increase the flow rate of the fluid circulating within the circuit.

12. The lamp assembly of claim 1 wherein the number of tubes is equal to the number of cold plates plus the number of radiators.

13. The lamp assembly of claim 2 wherein the cold plate is oriented in a generally upright orientation relative to the motor vehicle such that the cold plate channel extends from the cold plate inlet generally upwardly, relative to the motor vehicle, to the cold plate outlet.

14. The lamp assembly of claim 3 wherein the radiator is oriented in a generally upright orientation relative to the motor vehicle such that the radiator channel extends from the radiator inlet generally downwardly, relative to the motor vehicle, to the radiator outlet.

15. An automotive light assembly for a motor vehicle comprising:

a portion of the light assembly forming an enclosure;

at least one light source located within the enclosure and adapted to direct light out of the enclosure;

a closed-loop cooling circuit comprising:

at least one cold plate, the cold plate being thermally coupled to the light source;

at least one radiator; and a plurality of tubes connecting the cold plate to the radiator, the tubes at least partially vertically oriented relative to the vehicle and configured to circulate a fluid through from the cold plate to the radiator and the cooling circuit as a result of heating of the fluid by the cold plate and cooling of the fluid by the radiator.

16. The light assembly of claim 15 wherein the radiator is located within the enclosure.

17. The light assembly of claim 15 wherein the radiator is disposed outside of the enclosure.

18. The light assembly of claim 15 wherein the at least one light source includes a plurality of light sources.

19. The light assembly of claim 18 wherein the plurality of light sources includes at least one light emitting diode.

20. The light assembly of claim 15 wherein the at least one light source is a light emitting diode.

21. An automotive lamp assembly for a motor vehicle comprising:

at least one light source located within the lamp assembly; and a closed-loop cooling circuit comprising:

at least one cold plate, the cold plate being thermally coupled to the light source, the cold plate defines a cold plate channel having a cold plate inlet and a cold plate outlet, the cold plate outlet being located above the cold plate inlet relative to the motor vehicle;

at least one radiator; and a plurality of tubes connecting the cold plate to the radiator, the tubes at least partially vertically oriented relative to the vehicle and configured to circulate a fluid through the cooling circuit as a result of heating of the fluid by the cold plate and cooling of the fluid by the radiator.

* * * * *